United States Patent

Shimizu

[15] 3,663,955
[45] May 16, 1972

[54] APPARATUS FOR DETECTING ERROR DIRECTION TO ESTABLISH THE BALANCED STATE OF A BRIDGE CIRCUIT

[72] Inventor: Takeo Shimizu, Tokyo, Japan

[73] Assignee: Yokogawa-Hewlett-Packard, Ltd., Tokyo, Japan

[22] Filed: Oct. 23, 1970

[21] Appl. No.: 83,313

[30] Foreign Application Priority Data

Oct. 24, 1969 Japan..................................44/85558

[52] U.S. Cl..........................324/57 R, 324/60 R, 324/99 R
[51] Int. Cl.........................................................G01r 27/00
[58] Field of Search.....................324/57, 60, 61, 62, 65, 99, 324/98; 323/75

[56] References Cited

UNITED STATES PATENTS 3,445,763  5/1968  Harris, Jr......................324/57
3,532,972  10/1970  Wolfendale....................324/57

Primary Examiner—Gerard R. Strecker
Attorney—A. C. Smith

[57] ABSTRACT

The balanced state of a bridge circuit, for example, which measures the capacitance of an unknown capacitor by means of a self-balancing type transformer bridge, or the like, is determined from comparison of two split phase components with suitable reference levels as the bridge is automatically adjusted to a balanced condition.

3 Claims, 4 Drawing Figures

INVENTOR.
TAKEO SHIMIZU

INVENTOR.
TAKEO SHIMIZU

INVENTOR.
TAKEO SHIMIZU

APPARATUS FOR DETECTING ERROR DIRECTION TO ESTABLISH THE BALANCED STATE OF A BRIDGE CIRCUIT

BACKGROUND OF THE INVENTION

In a bridge circuit involving a test element and a variable element in which the variable element is adjusted according to the magnitude of an error or unbalance signal in order to reduce the error or unbalance signal to zero, it is usually difficult to reduce the error signal of the bridge circuit exactly to zero. Thus, certain known detection techniques establish that the bridge circuit is balanced when the error signal (or amplified error signal) is reduced down to within the range of a preselected constant reference level. This approximation of bridge balance thus provides an indication of the magnitude of the test element (for example, capacitance value of a capacitor, dissipation factor, etc.) in analog or digital form. It is usually desirable that the preselected constant level be as small as possible, as it will become a factor in determining the accuracy or the resolution of a measuring instrument. However, the preselected reference level of reference signal is usually made greater when capacitors are involved because the magnitude of the detection level may vary according to the magnitude of the ratio of the capacitance component and loss component, or as noise and higher harmonics become involved in the error signal. As the result, it is usually difficult in these conventional techniques to detect the perfect balancing point.

SUMMARY OF THE INVENTION

The present invention detects the polarity and the direction of the error signal and logically converges them one by one into the perfect balancing point.

DESCRIPTION OF THE PREFERRED EMBODIMENT

Figures 1, 3:
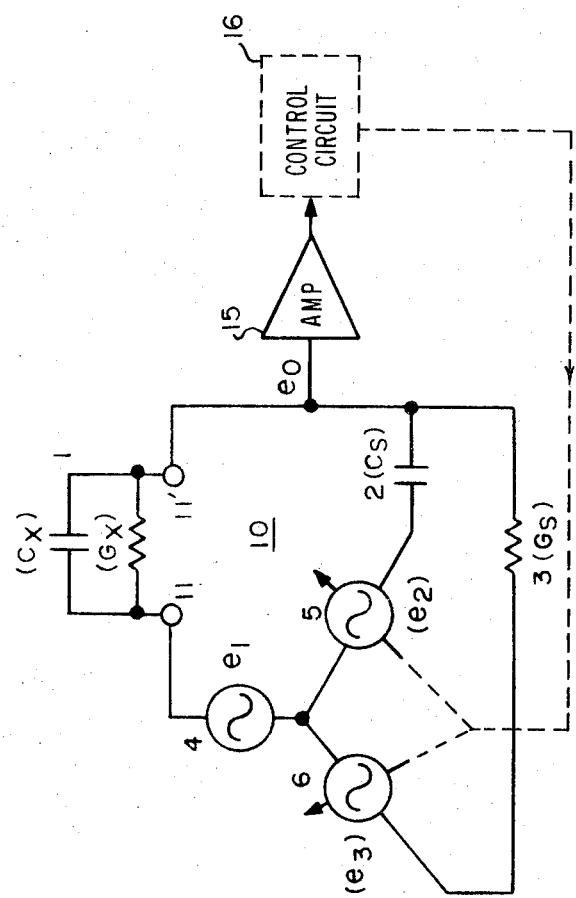
FIG. 1 is a bridge circuit according to one embodiment of the present invention.
FIG. 3 is the truth table of the logic circuits indicated in FIGS. 2a and b.

FIG. 1 is a simplified schematic diagram of a transformer bridge circuit in accordance with one embodiment of the present invention. The bridge circuit 10 consists of the first signal source 4 connected to the unknown or test element (capacitor) 1, the second signal source 5 connected to reference capacitor 2, and the third signal source 6 connected to reference conductance element 3. The error signal (or unbalanced voltage) $e_o$ is detected and may be used to adjust the magnitudes $e_2$, $e_3$ respectively of the second and third signal sources 5 and 6 in a way that the unbalanced voltage will become zero. The capacitance $C_x$ and the parallel conductance $G_x$ of test piece 1 at the time of this zero-balance may be obtained respectively by means of capacitance value $C_s$ of reference capacitor 2, conductance value $G_s$ of reference conductance element 3, and voltage ratios $e_2/e_1$, $e_3/e_1$. It is assumed here that voltage $e_1$ denotes the voltage of the first signal source 4, and that voltages $e_2$, $e_3$ are in opposite phases in relation to the voltage $e_1$.

Figure 2A:
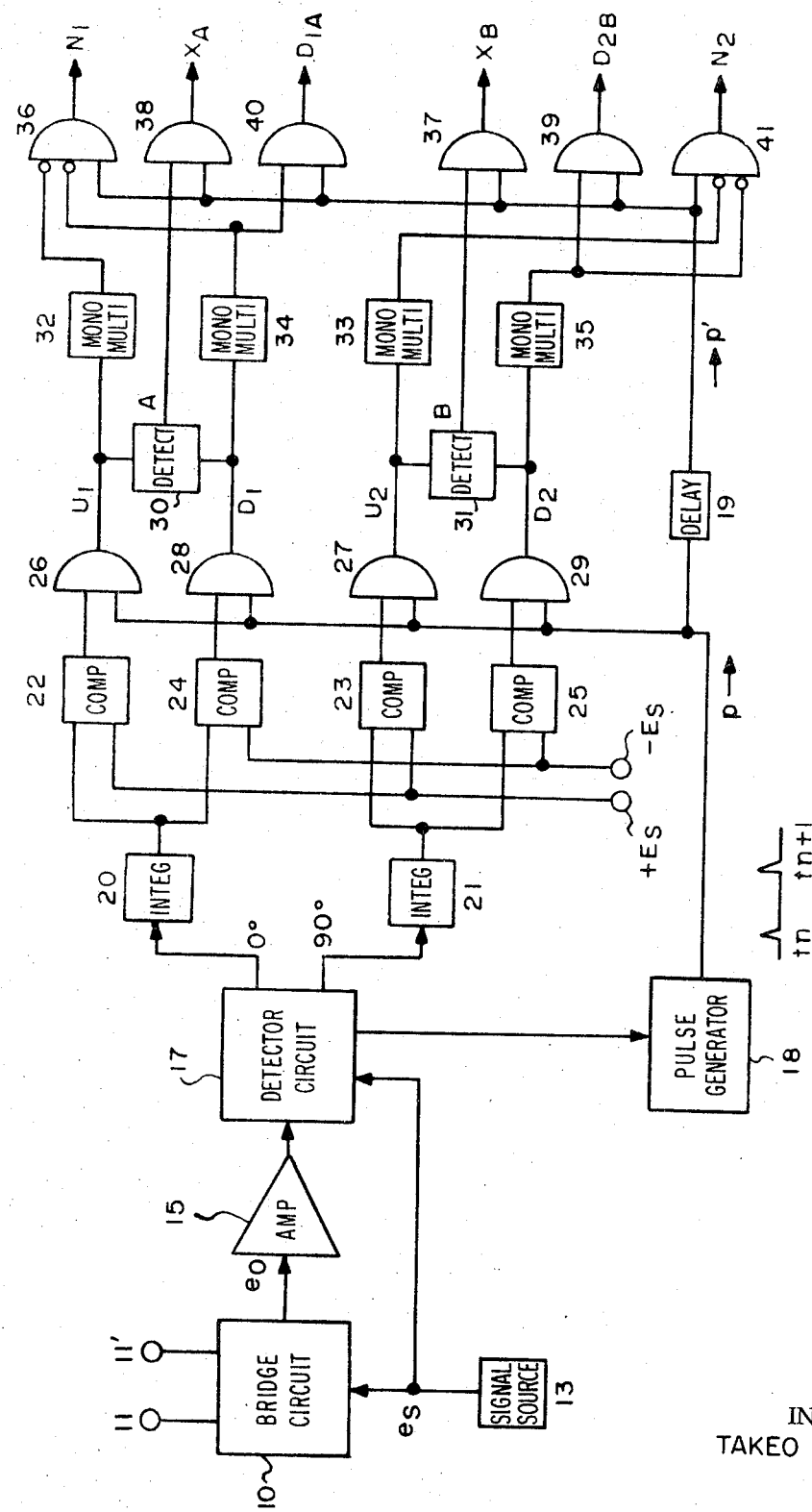
FIGS. 2a and b are system diagrams indicating preferred embodiments of the present invention.

FIGS. 2a and b are system diagrams indicating the preferred embodiment of the present invention for detecting the balanced state of the bridge circuit of FIG. 1. In FIGS. 2a and b, block 10 denotes the bridge circuit shown in FIG. 1, and the signal source 13 represents the group of signal sources 4, 5, 6 of FIG. 1. Amplifier 15 is connected to apply the amplified output error voltage $e_o$ from the bridge circuit 10 to a phase-detecting circuit 17. The phase-detecting circuit 17 detects the phase of error voltage $e_o$ amplified by amplifier 15 using as reference the output voltage $e_s$ from signal source 13 coming in through one of its inputs, and produces outputs which have in-phase components 0° and 90° in relation to said reference signal $e_s$ and which are applied to integration circuits 20, 21. In this case, the 0° component output of detecting circuit 17 represents the capacitance component of the unknown or test element (capacitor), and the 90° component output represents the loss component, namely, the conductance component. A timing-pulse generating circuit 18 is driven by part of the output of the detecting circuit 17 and the resulting output pulses P control the logic circuits later described herein either directly or via the delay circuit 19.

Comparison circuits 22, 23, 24 and 25 are connected to receive the outputs from each integration circuit 20, 21 at one input of each comparison circuit and these outputs are compared with the least upper limit value $+E_s$ or the greatest lower limit value $-E_s$ of the reference level applied to the other inputs. The comparison circuits produce output signals "1" when the two inputs coincide and these outputs from the comparison circuits 22 ~ 25 are applied to corresponding AND circuits 26–29 along with the timing pulse P from the pulse-generating circuit 18. Detecting circuits 30 and 31 are connected to detect the polarity of the integration circuit outputs or the polarity of the change or increment in the integration circuit output. The relation between the two inputs $U_1$, $D_1$ and the output A of detecting circuit 30 and the relation between inputs $U_2$, $D_2$ and the output B of detecting circuit 31 will be evident from the truth table of FIG. 3.

In the detecting circuit 30, for example, when time is $t_n$, the output $U_1$ of AND circuit 26 is "1", output $D_1$ of AND circuit 28 is "0", and at a next time $t_{n+1}$, when $U_1$ becomes "0" and $D_1$ becomes "1", output A will become "1". In addition, digital indication is given of the capacitance component and loss component of the test element (capacitor) by triggering a reversible counter on the outputs $U_1$, $D_1$, $U_2$, $D_2$ of AND circuits 26–29 respectively, and at the same time by operating bridge circuit 10 through suitable conventional control circuitry 16 (conventional details not shown) to establish self-balance operation. Monostable multivibrator circuits 32–35 respectively emit signals "1" or "0" at their outputs in response to the signals impressed on their inputs. Then, AND circuit 36 receives the output signals from the multivibrator circuits 32, 34 and the timing pulse P' that come through the delay circuit 19, and emit output signal $N_1$ in response to the combined signals. Also, AND circuit 38 produces output $X_A$ in response to the combination of the output A of said detecting circuit 30 and the delayed pulse P', and AND circuit 40 produces output $D_{1A}$ in response to the combination of the output signal of multivibrator circuit 34 and the pulse P'. AND circuits 37, 39, 41 behave in a manner similar to AND circuits 36, 38, 40, to produce outputs $X_b$, $D_{2B}$, $N_2$ respectively.

Here, with reference to the integration circuits 20, 21, two time periods, say long and short periods (20 ms and 1 ms, for example) are provided in integrating the respective component voltages. The one of the integrating time periods to select is not decided with respect to adjustment (i.e. self-balance operation) of the magnitude of the variable element in the bridge circuit, but rather by sampling the compared results of the integrating circuit output and the reference level $E_s$ (0.5V, for example) always after a constant time (1 ms, for example). These relations can be expressed as follows: When $$\left| \int_0^{nt} E_o dt \right| \geq \left| E_s \right| \qquad (1)$$

the shorter (1 ms) integration time is selected, and when $$\left| \int_0^{nt} E_o dt \right| < \left| E_s \right| \qquad (2)$$

the longer (20 ms) integration time is selected. Here, it is assumed that $t$ represents the period of the signal source $e_s$, and that $nt = 1$ ms. Also, $E_o$ represents the output voltage (this signifies the respective output of 0° component and 90° component) of the phase-detecting circuit 17. In other words, when the error voltage of bridge circuit is great, a balance operation utilizing the 1 ms integration time is quickly conducted (so-called crude adjustment), whereas when the error voltage becomes so small that it approaches the balancing point of the bridge, a fine balance operation utilizing the 20 ms integration time is carried out. In the latter case, it is assumed that the balance operation is being carried out under a condition where the detecting sensitivity of the so-called error signal is the highest. And, the balance operations for the capacitance component and for the loss component of the error signal are carried out alternately by means of a suitable conventional control circuit (not shown in the figure). For example, a self-balance operation of the capacitance component is carried out in response to command signal from the C output of the control circuit, and then a balance operation of the loss component is carried out in response to a command signal from the G output of the control circuit.

The following are the respective output codes of AND circuits 36–41 shown in said FIG. 2a and of the logic codes discussed later herein.

$X_A$: The value is "1" when the increment polarity of the capacitance component of the error signal has inverted.

$X_B$: The value is "1" when the increment polarity of the loss component of the error signal has inverted.

$N_1$: The value is "1" when the capacitance component of the error signal (or its integration output) has not reached the reference level $\pm E_s$.

$N_2$: The value is "1" when the loss component of the error signal (or its integration output) has not reached the reference level $\pm E_s$.

H: The value is "1" when the error signal in this system is being detected in a state of the highest sensitivity.

$G_{LC}$: The value is "1" when the self-balance operation on the capacitance component is being carried out at the least significant position.

$G_{L\sigma}$: The value is "1" when the self-balance operation on the loss component is being carried out at the least significant position.

$O_A$: The value is "1" when voltage $e_2$ in FIG. 1 is zero.

$O_B$: The value is "1" when voltage $e_3$ in FIG. 1 is zero.

$D_{1A}$: The value is "1" when the capacitance component error signal has reached the negative reference level $-E_s$.

$D_{2B}$: The value is "1" when the loss component of the error signal has reached the negative reference level $-E_s$.

The balanced state of the present invention may be expressed in a logic formula utilizing the above codes, as follows:

$$H \cdot (O_A \cdot D_{1A} + N_1 + G_{LC} \cdot X_A) \cdot (O_B \cdot D_{2B} + N_2 + G_{L\sigma} \cdot X_B) + (G_{LC} \cdot G_{L\sigma}) H (O_B \cdot D_{2B} + N_2 + X_B) \cdot \{(O_A \cdot D_{1A} + N_1 + X_A) \cdot 3)\} \quad 3.$$

Here, the term inside the { } indicates that three bits of the timing pulse shifting from $\boxed{c}$ command to $\boxed{G}$ command or from $\boxed{G}$ command to $\boxed{c}$ command. Also, ($O_A \cdot D_{1A}$) indicates that the test element (capacitor, herein) is inductive, and that ($O_B \cdot D_{2B}$) indicates that the loss of the test element capacitor is smaller than that of the reference capacitor. Consequently, in formula (3), the first term indicates the balancing condition of a normal case, and the second term indicates an abnormal case which arises as there is no lower position than the least significant position.

Figure 2B:
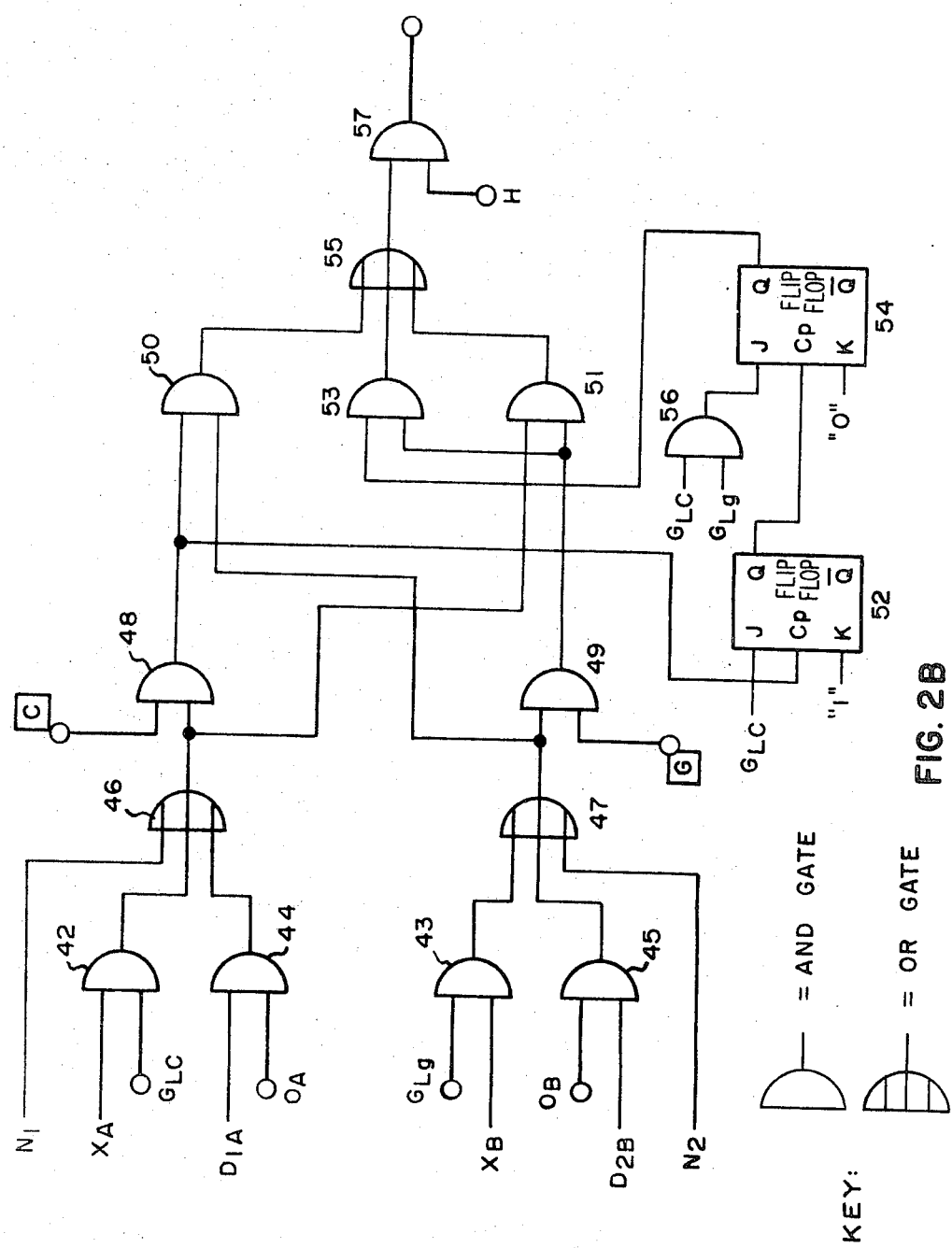

FIG. 2b is a flow diagram indicating the logic circuit groups for obtaining a balancing condition of formula (3). With reference to FIG. 2b, the signals $X_A$ and $G_{LC}$ are applied to the input of AND circuit 42 and the signals $O_A$ and $D_{1A}$ are applied to the input of AND circuit 44. The respective output of these AND circuits 42, 44 are applied to OR circuit 46 along with signal $N_1$, and the output of circuit 46 is aligned to one input of AND circuit 48. The other input of AND circuit 48 receives a signal that corresponds to the $\boxed{c}$ output command signal. In a similar manner, AND circuit 43 receives two signals $X_b$, $G_{L\sigma}$, and AND circuit 45 receives $O_B$, $D_{2B}$. The respective outputs of AND circuits 43, 45 and the signal $N_2$ are applied to one input of AND circuit 49 via OR circuit 47. At this time, a signal that corresponds to $\boxed{G}$ command signal is applied to the other input of AND circuit 49. AND circuit 50 receives the output of AND circuit 48 and the output of OR circuit 47, AND circuit 51 receives the output of AND circuit 49 and the output of OR circuit 46, and the respective outputs of these AND circuits 50, 51 are applied to the input of OR circuit 55 along with the output of AND circuit 53 which shall be described later herein. The flip-flop circuits 52, 54 are logic circuits which define the second term of balancing condition formula (3), and with reference to the initial-step flip-flop circuit 52, its output Q inverts 1 0 or 0 1 every time input CP becomes "1" while the input J to which signal $G_{LC}$ is applied is "1". Then, with reference to the second flip-flop circuit 54, its output Q will always be "1" if the input CP is "1" when the input J (this is the output of AND circuit 56 which is the combination of signals $G_{LC}$, $G_{L\sigma}$) is "1". Thus, the output of OR circuit 55 and the signal H are combined by AND circuit 57 which provides an output signal that indicates whether the balancing condition is satisfied or not. Thus, foe example, when the balancing condition is satisfied, the signal will stop the timing pulse generator 18 and at the same time complete the measurement, and indicate the same, as by lighting an indicator lamp, or the like.

As detailed above, detection of the balanced status of the bridge circuit of the present invention is carried out in the following manner: the error or unbalance signal is separated into an in-phase component and a 90° component with respect to the driving signal of the bridge circuit. Each of these components is applied to the integration circuits with the least upper limit (supremum) value (positive value) or with the greatest lower limit (negative value). The comparison results are sampled after every constant interval, the increment polarity (i.e. slope) is detected to determine whether it has inverted or not, and the balancing point of said bridge is then determined on the basis of these detecting signals. Thus, the resolution is greatly improved in comparison with conventional automatic balancing bridge.

Further, the application of the present invention is not confined to the above-mentioned examples. It is possible, for example, to omit the integration circuits 20, 21 in FIG. 2a. Also, as a means for changing over the detecting sensitivity of the present invention, the amplification factor of error amplifier 15 may be altered instead of, as in the preferred embodiment, altering the integration time period used.

I claim:

1. An automatic balancing system for a bridge circuit which includes an element under test and a pair of variable elements, the system comprising:

a source of test signal connected to the bridge circuit;

means connected to a bridge circuit for producing an output signal therefrom representative of the balance condition of the bridge circuit;

phase separator means connected to receive the output signal for providing first and second signals which are selectively separated in phase;

sources of first and second reference signals, said first reference signal having greater magnitude than said second reference signal;

first and second level comparator means, each connected to receive the first and second reference signals and the first and second signals for producing first and second control signals, the first control signal being representative of the first signal having attained a value between first and second reference signals, and the second control signal being representative of the second signal having attained a value between the first and second reference signals; and control means coupled to variable elements of the bridge circuit for sequentially altering the elements therein in response to said first and second control signals to converge the balance state of the bridge circuit on null.

2. An automatic balancing system as in claim 1 wherein:

said phase separator means is coupled to said source of test signal for providing a pair of error signals which are separated in phase by about 90° degrees and which have magnitudes and polarities representative of the balance condition of the bridge circuit; and said phase separator means includes a pair of integrators, each coupled to receive one of said pair of error signals to produce said first and second signals therefrom as the integral of the respective error signal over a selected period.

3. An automatic balancing system as in claim 2 comprising timing means coupled to said phase separator means for altering the selected integral period in response to the comparison of one of said reference signals and one of said first and second signals.

* * * * *

UNITED STATES PATENT OFFICE
CERTIFICATE OF CORRECTION

Patent No. 3,663,955          Dated May 16, 1972

Inventor(s) Takeo Shimizu

It is certified that error appears in the above-identified patent and that said Letters Patent are hereby corrected as shown below:

Column 2, line 51, "$X_b$" should read -- $X_B$ --;

Column 3, line 70, "$X_b$" should read -- $X_B$ --;

Column 4, line 9, "1   0 or 0   1" should read -- $1 \rightarrow 0$ or $0 \rightarrow 1$ --; line 17, "foe" should read -- for --.

Signed and sealed this 2nd day of January 1973.

(SEAL)
Attest:

EDWARD M. FLETCHER, JR.
Attesting Officer

ROBERT GOTTSCHALK
Commissioner of Patents